UNITED STATES PATENT OFFICE.

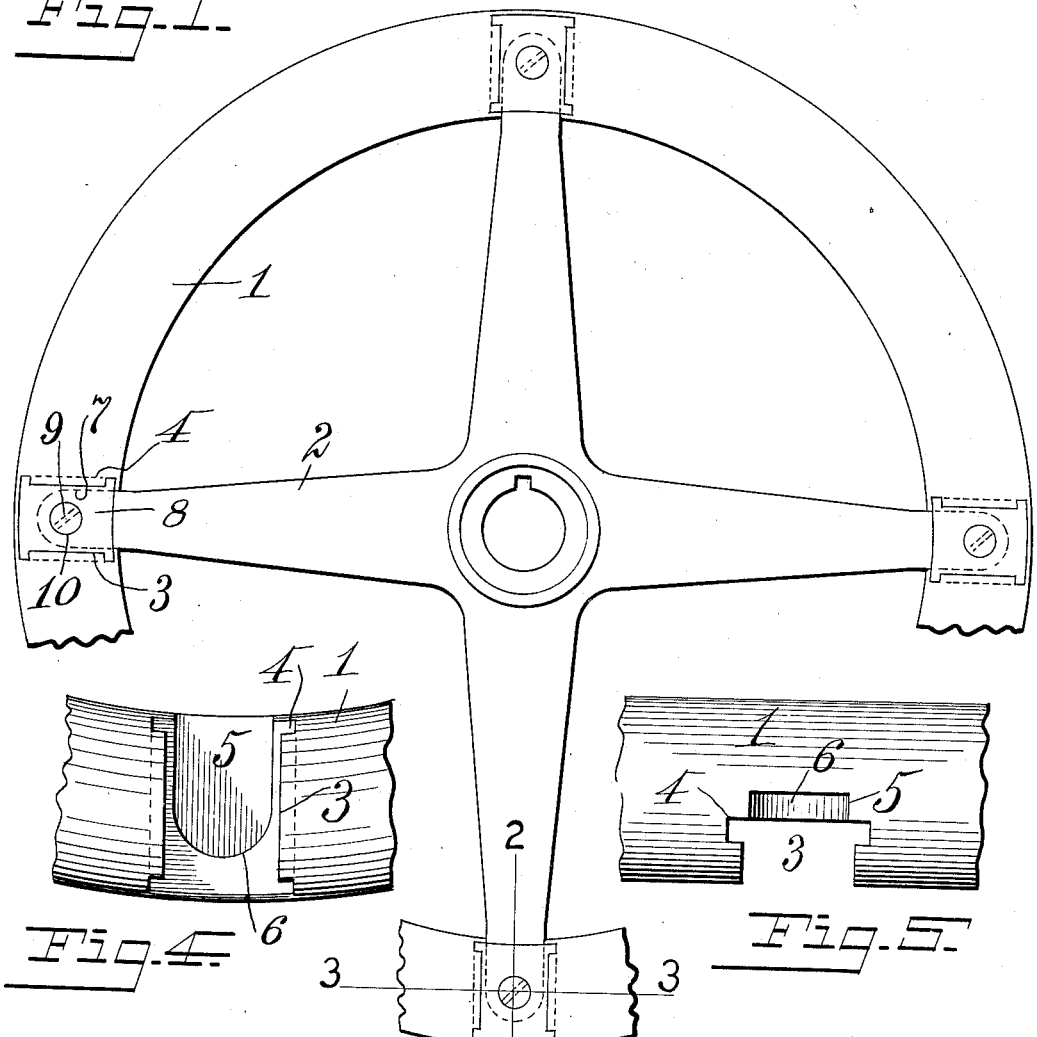

JOSEPH N. KELLY, OF DAYTON, OHIO, ASSIGNOR TO OHMER FARE REGISTER COMPANY, OF DAYTON, OHIO.

STEERING-WHEEL.

1,333,024.　　　Specification of Letters Patent.　　Patented Mar. 9, 1920.

Application filed July 14, 1919. Serial No. 310,842.

*To all whom it may concern:*

Be it known that I, JOSEPH N. KELLY, a citizen of the United States, residing at Dayton, in the county of Montgomery and State of Ohio, have invented certain new and useful Improvements in Steering-Wheels, of which the following is a specification.

This invention relates to steering wheels for motor driven vehicles.

The object of the invention is to provide new means for attaching the ends of the metallic spider arms to the wood rim or wheel, both of which elements constitute the steering wheel.

A further object of the invention is to provide a safe and absolutely reliable means for uniting the metallic and wooden parts of the wheel in a manner that will insure a lasting permanent connection between the two parts.

The invention may be said to relate to an improved and a simplified method of inserting or applying the spider of a steering wheel to the wood rim thereof. The object being to provide fastening means which will be solid and substantial without weakening the structural part of the wood rim.

Also means for uniting the ends of the spider, and finishing the wood rim after the spider is inserted therein, without leaving any disfiguring marks or defacements of the wood rim.

The accompanying drawings and the description to follow will enable a comprehensive understanding of the improvements, referring first in general terms to said drawings.

Figure —1— is a view of an underside of a steering wheel with parts of the rim broken out to facilitate space.

Fig. —2— is a sectional view through the rim and the end of one of the spider arms, said view being on the line 2—2 of Fig. —1—.

Fig. —3— is a sectional view on the line 3—3 of Fig. —1—.

Fig. —4— is a view of the underside of the rim with parts broken away. This shows the formation of the openings for the attachment of the spider arms. And, Fig. —5— is a view of the outer periphery of the rim with parts thereof broken away, showing one of the finished apertures.

In a more particular description of the invention the same reference characters will designate corresponding parts in the several views of the drawings.

The wood rim —1— constitutes one of the well known elements of an automobile steering wheel, and —2— designates the parts of a metallic spider which constitute the other well known element of a steering wheel. The means whereby these two elements are united consists in forming in the wood rim at four diametrical opposite points, an equal number of T-slots —3— which are machined in the underside of the wood rim and have the form as shown in Fig. 5. When these T-slots are formed the parts —4— having the widest diameter lie inwardly in the rim and terminate on one side of the center of said rim. After the operation of machining the said T-slots to the form shown, an aperture —5— is counter bored in the base of each thereof, said counter bores extending into the rim from the inner periphery thereof. As shown in Fig. —4— the said counter bores —5— do not extend entirely through the rim but terminate in outer rounded ends —6—. These counter bored openings —5— extend into the rim from the base of the T-slots and admit of the insertion of the ends or lug portions —7— of the spider arms —2—. In assembling the parts, the wood rim is turned over with the underside up, as shown in Fig. —1— and the spider is placed in position with the lugs or ends —7— occupying the spaces of the counter bored openings —5—. The spider being thus positioned with the several arms located in the several apertures in the rim, said arms are inclosed by an equal number of blocks or plugs —8— which are made of a form and size to neatly set in the said T-slot in said rim. The blocks —8— are inserted after being coated with a suitable application of glue, said insertion being with the faces of the blocks contacting with the upper sides of the spider arms thereby securely locking said spider arms in the rim. The said blocks —8— are preferably cut from the material with the grain of the wood running in the proper direction so that when said blocks are finished to conform to the outer lines or surface of the rim, the grain of the wood in both the rim and blocks run in the same direction, thus insuring a uniform finish and appearance of the rim. The dotted lines in Fig. 2 show the block before cut down to the contour of the rim.

As a further means of securing the block members and the spider in the wood rim, wood screws —9— of suitable size are inserted from below through apertures in the block members and apertures in the inserted ends of the spider arms and the rim, thereby locking the parts firmly together. The said screws are inserted preferably in the underside of the rim in counter sunk openings —10— and after their insertion the spaces below the heads of the screws are filled with a suitable composition, such for example as saw dust mixed with glue. After this the surface is finished off thereby eliminating any possible blemish of the surface of the rim. The openings for said screws in the blocks, as well as the openings in the inserted ends of the spider arms, and those in wheel rim are bored after the arms and blocks are inserted in the rim.

Any tendency of the spider arms to work loose is avoided by this union between the spider and the rim of the wheel and any possible weakening of the wood structure of the rim is avoided.

Having described my invention, I claim:

1. In a steering wheel, the combination of a wood rim having a plurality of T-shaped grooves extending therethrough, and a counter bored opening extending into said rim from the base of each of said grooves, a spider the ends of the arms of which extend into said counter bored openings, and blocks secured in said T-shaped grooves and holding the said arms securely in position.

2. In a steering wheel, the combination of a wood rim having a plurality of grooves cut in the lower periphery thereof and extending cross-wise of the rim, the inner terminals of each of said grooves being of greater transverse diameter than the entrance thereto, a counter sunk opening extending from the inner periphery of the rim from the base of each of said grooves and terminating in an outer abutment which lies in, a substantial distance from the outer periphery of the rim, a spider the arms of which extend into said counter sunk openings and lie flush with the base of said grooves, and a series of blocks filling said grooves and engaging the inserted ends of said arms.

3. A steering wheel comprising a wood rim and a metallic spider, the rim being provided with diametrically opposite recesses cut through the lower periphery thereof from one side to the other, said recesses being of greater transverse diameter at the inner terminals thereof, a counter sunk recess extending into the rim from the inner periphery thereof and from the base of each of the first named recesses, said counter sunk recesses terminating inwardly from the outer periphery of the rim, and adapted to receive the ends of the spider arms, a series of blocks within said first named recesses, counter sunk screws penetrating said blocks and the ends of the spider arms, and means for concealing the counter sunk ends of said screws.

In testimony whereof I affix my signature.

JOSEPH N. KELLY.